(12) United States Patent
Blakeley, III

(10) Patent No.: US 7,111,981 B2
(45) Date of Patent: Sep. 26, 2006

(54) INSTRUMENT FOR NON-CONTACT INFRARED TEMPERATURE MEASUREMENT COMBINED WITH TACHOMETER FUNCTIONS

(75) Inventor: Gerald W. Blakeley, III, Lincoln, MA (US)

(73) Assignee: Extech Instruments Corporation, Waltham, MA (US)

( * ) Notice: Subject to any disclaimer, the term of this patent is extended or adjusted under 35 U.S.C. 154(b) by 0 days.

(21) Appl. No.: 10/911,177

(22) Filed: Aug. 4, 2004

(65) Prior Publication Data

US 2005/0147152 A1 Jul. 7, 2005

Related U.S. Application Data

(60) Provisional application No. 60/534,474, filed on Jan. 6, 2004.

(51) Int. Cl.
*G01J 5/00* (2006.01)
*G01K 13/00* (2006.01)

(52) U.S. Cl. .................. 374/121; 374/142; 73/529

(58) Field of Classification Search ............ 374/142, 374/130, 120, 121; 702/135; 73/527–529, 73/488; 356/27, 28
See application file for complete search history.

(56) References Cited

U.S. PATENT DOCUMENTS 4,823,080 A * 4/1989 Lin .............................. 73/529

6,078,874 A * 6/2000 Piety et al. .................. 702/122
6,095,682 A * 8/2000 Hollander et al. ........... 374/121
6,832,521 B1 * 12/2004 Courtney et al. ............. 73/658
2004/0213319 A1 * 10/2004 Lancon et al. ................ 374/57

OTHER PUBLICATIONS

ENTEK, Rockwell Automation, Integrated Condition Monitoring Solutions, "Enpac(TM) Family" brochure, Publication No. ENPOR-TD101B-EN-P, published Mar. 2002.*
"Portable Infrared Thermometer", Davis Instruments Catalog, vol. 59, pp. 256-257 (no month, est. 1993, received at USPTO prior to year 2000).*
SKF, "Bearing overheating costs time and money," brochure downloaded from www.mapro.skf.com @USPTO Nov. 2005, 4 pages, (published Sep. 2003).*

* cited by examiner

*Primary Examiner*—G. Bradley Bennett
(74) *Attorney, Agent, or Firm*—Brian M. Dingman, Esq; Mirick, O'Connell, DeMallie & Lougee, LLP

(57) ABSTRACT

A handheld instrument that accomplishes non-contact infrared (IR) temperature measurement, and the measurement of movement of an object. The instrument has a case, and a movement-sensing device coupled to the case and operable to be directed toward or placed against an object being measured, for generating an output signal based on the sensed movement. An IR detector, also carried by the case, senses IR energy emitted from a surface being measured along an IR-sensing axis that extends from the case, and generates an IR output signal. The sensed IR energy is converted to a temperature value, and the output signal from the current-sensing device is converted to at least a measured current value. A display device in the case displays instrument measurements to the user.

17 Claims, 5 Drawing Sheets

INSTRUMENT FOR NON-CONTACT INFRARED TEMPERATURE MEASUREMENT COMBINED WITH TACHOMETER FUNCTIONS

CROSS REFERENCE TO RELATED APPLICATION

This application claims priority of Provisional application Ser. No. 60/534,474, filed on Jan. 6, 2004.

FIELD OF THE INVENTION

This invention relates to an instrument having the functionality of both a non-contact infrared (IR) temperature measurement device and a device for measuring the speed of a moving or rotating structure.

BACKGROUND OF THE INVENTION

Many machines require the non-contact measurement of temperatures, such as bearings or heated surfaces, which may not be readily available or unsafe to measure directly due to moving machinery. These machines may also require measurement of rotating or linear speed. Present practices require the use of two different instruments to perform these tasks. This adds to the expense, and is inconvenient for the user.

SUMMARY OF THE INVENTION

It is therefore a primary object of this invention to provide a handheld instrument that accomplishes the functionality of an instrument for measuring the speed of a moving or rotating structure and also is capable of infrared temperature measurements of a surface.

It is a further object of this invention to provide such an instrument in which the temperature measurement can be held in the display for a time after it is taken, to allow the user to look at the display in a more convenient setting.

It is a further object of this invention to provide such an instrument that is fully self-contained.

This invention features a handheld instrument that accomplishes non-contact infrared (IR) temperature measurement and the measurement of movement of an object. The inventive instrument comprises a case, a movement-sensing device coupled to the case and operable to be directed toward or placed against an object being measured, for generating an output signal based on the sensed movement, and an IR detector carried by the case, for sensing IR energy emitted from a surface being measured along an IR-sensing axis that extends from the case, and generating an IR output signal. There are means for converting sensed IR energy to a temperature value, and for converting the output signal from the movement-sensing device to at least a measured movement value. A display device in the case displays instrument measurements to the user.

The handheld instrument may further comprise an aiming device carried by the case for emitting visible light along an aiming axis, to assist the operator in aiming the IR detector. The aiming device may comprise a laser diode. The aiming axis may be close to the IR-sensing axis. The aiming axis and the IR-sensing axis may be essentially parallel to one another, or may be fixed at a slight angle to one another.

The means for converting sensed IR energy to a temperature may accomplish a fixed emissivity. The means for converting may comprise an analog to digital converter for digitizing the movement-sensing device output signal and the IR output signal. The handheld instrument may further comprise means for maintaining a sensed temperature on the display device after the IR detector is no longer aimed at the surface being measured. The handheld instrument may further comprise a power source carried within the case, for supplying power to at least the IR detector, the means for converting, and the display device. The power source may comprise a DC power source such as a battery.

The handheld instrument may further comprise switch means to control which signal is displayed. The display device may be a digital display device or an analog display device. The aiming axis and the IR-sensing axis may both intersect the end of the case. The movement-sensing device may comprise a shaft adapted to be rotated by the object whose movement is being measured. The movement-sensing device may further comprise a friction structure coupled to the distal end of the shaft, for placement on the object being measured.

The movement-sensing device may comprise a photo detector having a sensing axis. The handheld instrument may further comprise a light source carried by the case and adapted to shine light along a light axis from the case onto the object being measured. The photo detector may be adapted to capture light shone on and reflected from the object being measured. The photo detector sensing axis may be essentially parallel to the light axis.

Also featured is a handheld instrument that accomplishes non-contact infrared (IR) temperature measurement and the measurement of movement of an object. The instrument comprises a case, a movement-sensing device coupled to the case and operable to be directed toward or placed against an object being measured, for generating an output signal based on the sensed movement, an IR detector carried by the case, for sensing IR energy emitted from a surface being measured along a sensing axis that extends from the case, and generating an IR output signal. There is a laser diode aiming device carried by the case for emitting a visible beam along an aiming axis, to assist the operator in aiming the IR detector, means for converting sensed IR energy to a temperature value using a fixed emissivity, and means for converting the output signal from the movement-sensing device to at least a measured movement value. There is a display device in the case, for displaying instrument measurements to the user, and a battery power source carried within the case, for supplying power to at least the IR detector, the laser diode, the means for converting, and the display device.

The fixed emissivity may be about 0.95. The aiming axis may be close to the sensing axis. The aiming axis and the sensing axis may be essentially parallel to one another, or may be fixed at a slight converging angle to one another.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS OF THE INVENTION

In the invention, the common functions of the IR temperature measurement and those of a tachometer are combined into one circuit with common display and other functional aspects. The housing includes the IR sensing element, and the optional laser-based IR sensor aiming device.

Figure 1:
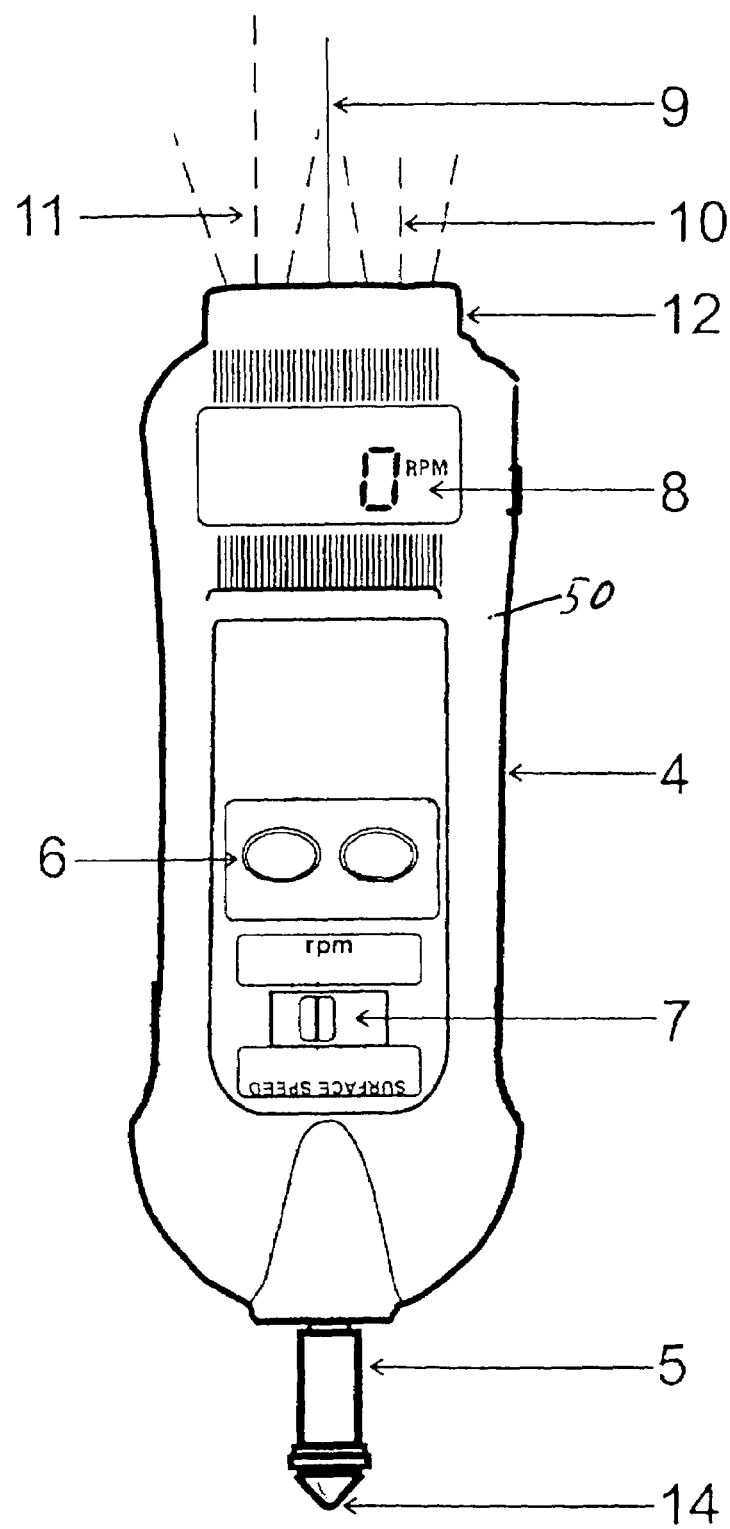
FIG. 1 is a top view of the preferred embodiment of the handheld instrument for non-contact infrared temperature measurement and for measuring the speed of a moving or rotating structure, according to this invention.
Figure 2:
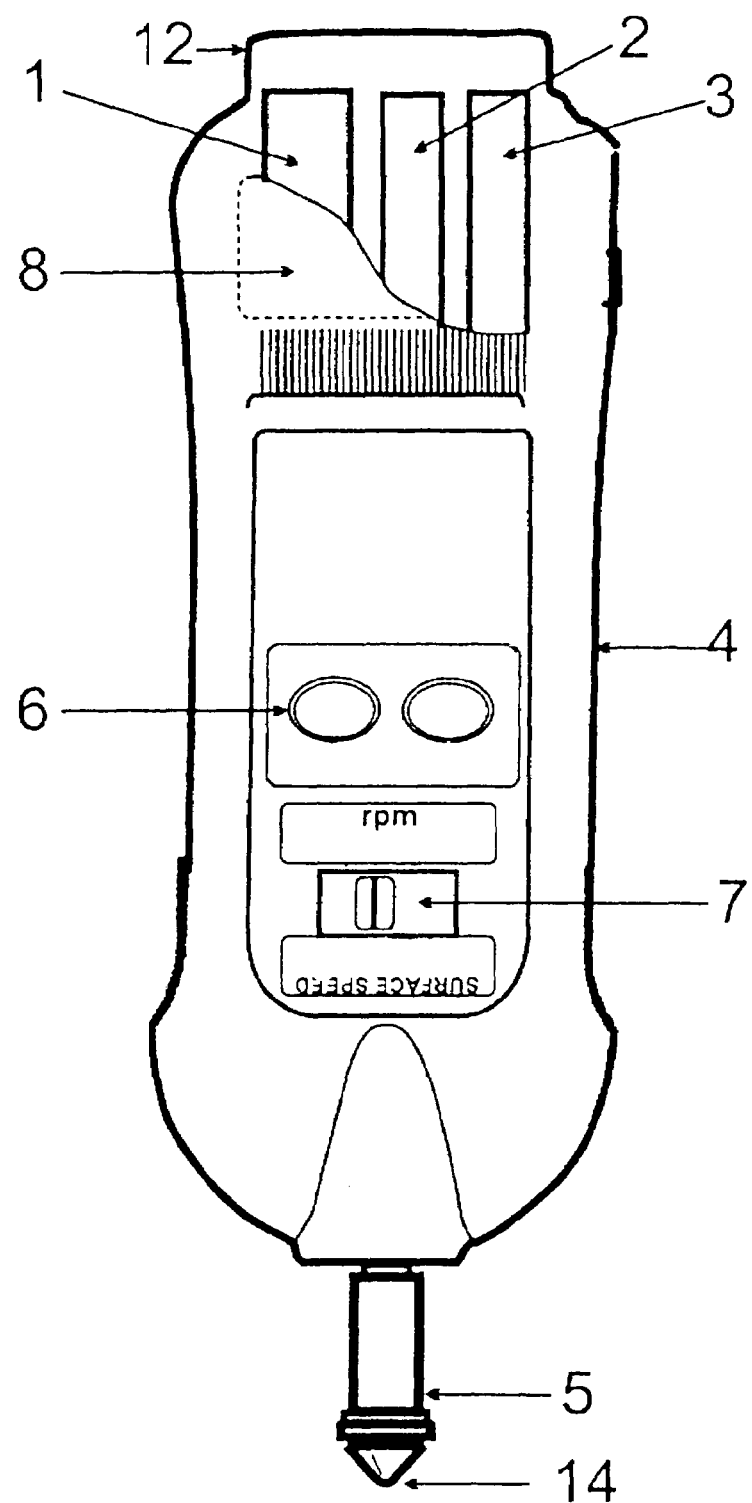
FIG. 2 is a partially cross-sectional view of the instrument FIG. 1.
Figure 3:
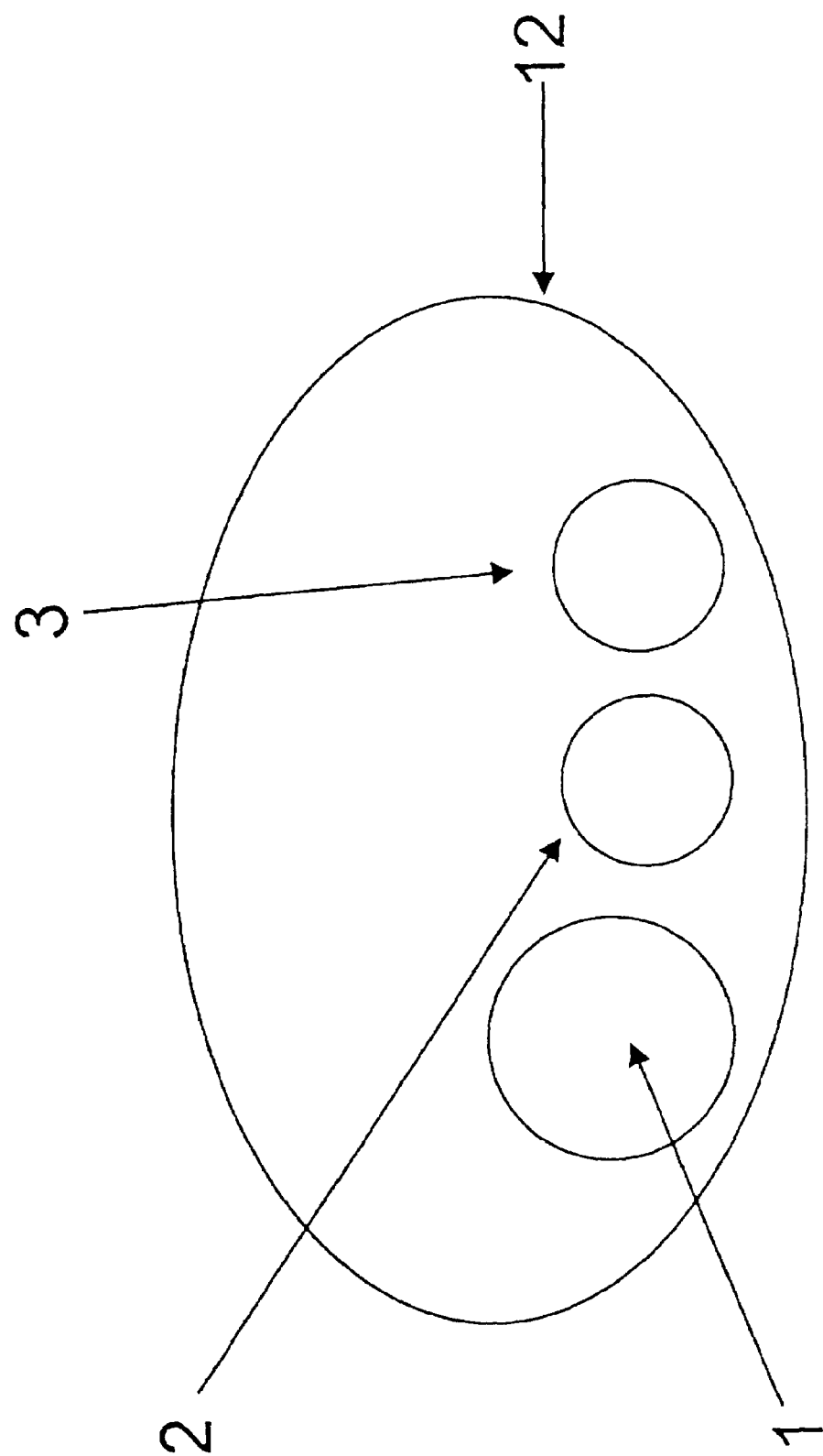
FIG. 3 is an end view of the instrument of FIG. 1.

The mechanical arrangement of the preferred embodiment is shown in FIGS. 1, 2, and 3. FIG. 1 is a top or front view of instrument 50 of this invention. Instrument 50 comprises housing or case 4 to contain the functions in a convenient hand-held unit, digital display 8 for displaying to the user the values being measured, pushbutton switch 6 to activate the IR temperature measurement, and slide switch 7 to allow the user to select the tachometer measurement mode, and select the units to be displayed. Other embodiments may use these pushbuttons and switches in combination or alone to achieve the same result. In addition (and not shown here) rotary switches or keypads may also be used.

Opening 12 is in the end of case 4 where the IR sensor is mounted, together with the optical sensor of a non-contact tachometer (when present). Axis 11 of the IR sensor, axis 10 of the tachometer photo detector, and axis 9 of the light source for the photo tachometer, are shown. If this light source is sufficiently focused (e.g., using a lens, not shown), it can be used to assist in aiming the IR sensor at the surface whose temperature is being measured. In addition to or in place of the non-contact tachometer, optional contact-type tachometer 5 includes a rotatable shaft carrying a distal friction cone 14, which is held against and rotated by the moving or rotating device being measured. Friction cone 14 may be replaced by other devices, such as a friction wheel (not shown) to measure the linear speed of moving belts or similar devices.

FIG. 2 is a partially cutaway view below the display showing the relative locations of the non-contact tachometer light source 2, photo detector sensor 3, and IR sensor 1. In this preferred embodiment, this side-by-side arrangement allows the sensors to share the same light source. Other arrangements of either tachometer together or alone, and the IR temperature function, may be used in other embodiments. With this arrangement, switch 7 turns on either the photo tachometer or the contact tachometer, selects the units to be displayed by the tachometer, and when in the contact mode reverses the display 8, to make it easier to read while being held against a structure or device being measured. Pressing pushbutton 6 switches off the tachometer functions, turns on the IR measuring function, and if provided, turns on the laser aiming device or shared tachometer light source to assist in aiming the IR sensor.

FIG. 3 is an end view showing open end 12 of the case, IR sensor 1, laser or light source 2 that is used to assist aiming the IR sensor or that provides the light source for the photo tachometer, and photo detector sensor 3.

Figure 4:
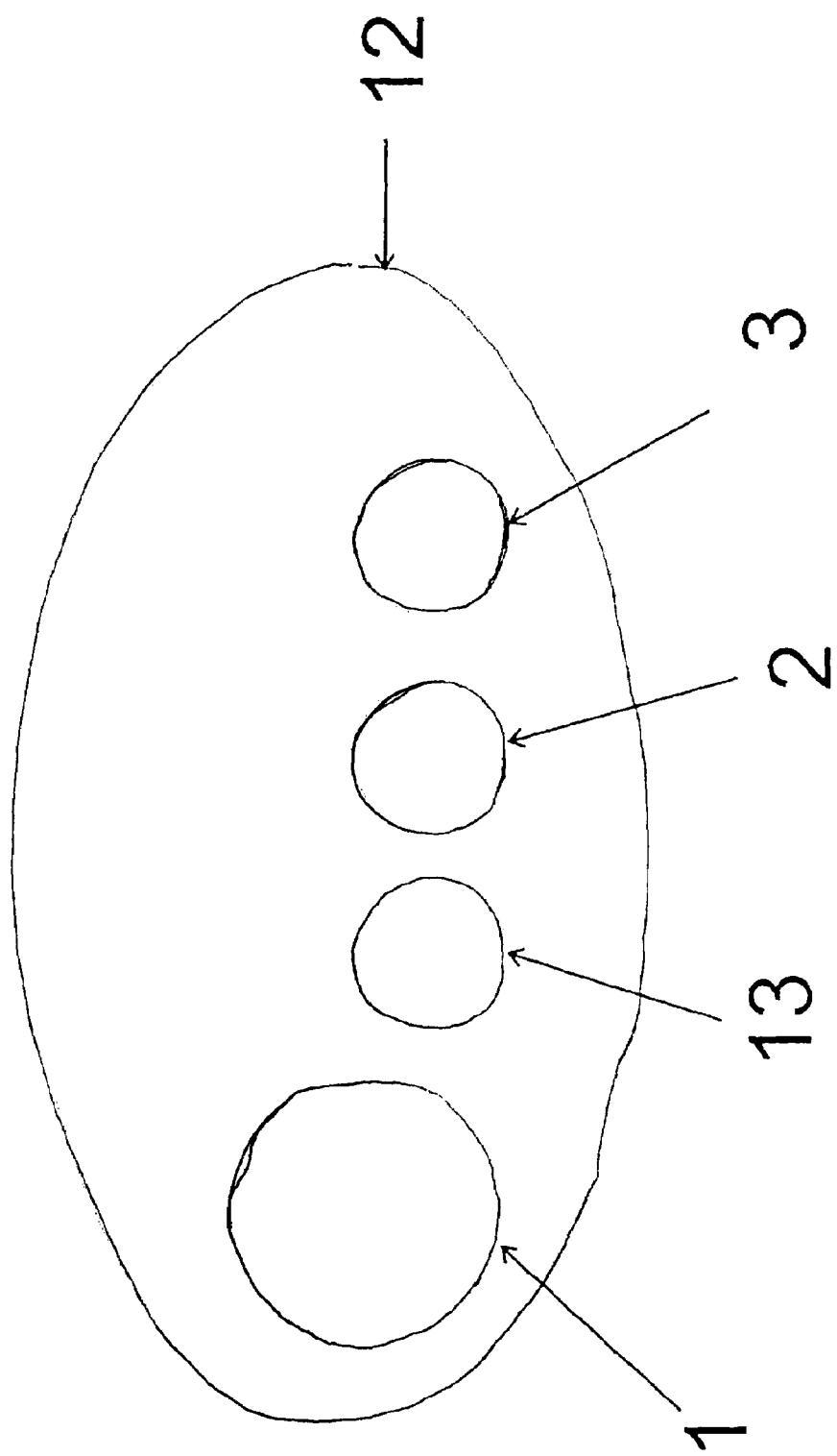
FIG. 4 is a similar end view of an alternative embodiment of the invention.

FIG. 4 shows another embodiment in which the IR function and photo tachometer functions do not share the same light source. In this embodiment, a separate diode laser 13 is used to assist in aiming the IR temperature sensor at the surface being measured. The beam from diode laser 13 may be set parallel to or at a slight converging angle to the IR sensing axis. Non-contact photo detector 3 and light source 2 that is reflected off the moving machinery, are also shown.

Figure 5:
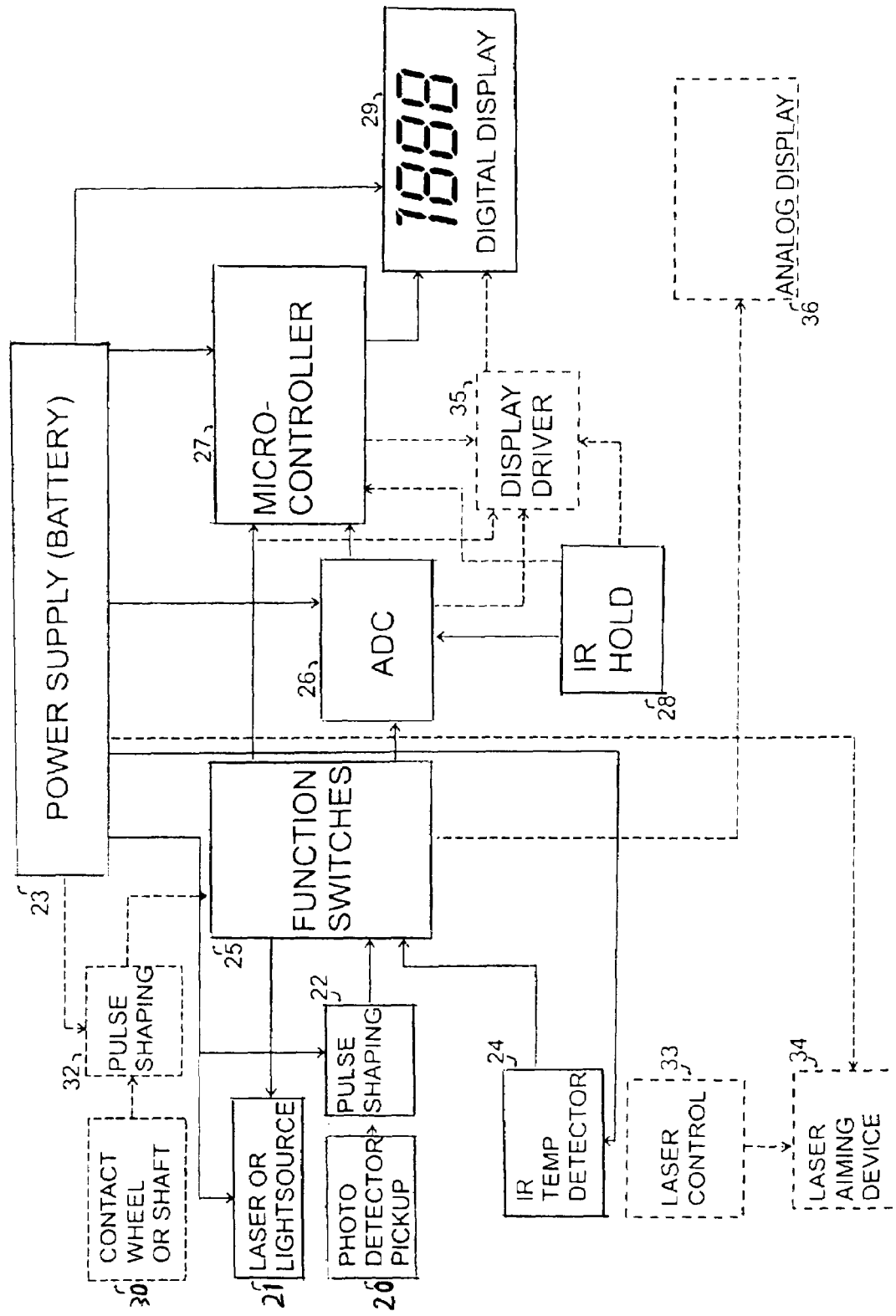
FIG. 5 is a block diagram of the circuit functions of the preferred embodiments of the instrument of this invention.

FIG. 5 is a diagram of the circuit functions and shows the commonality of the devices shared by both the IR measuring function and the tachometer functions. The output of the IR temperature detector circuit 24 is switched through function switches 25 to the analog to digital converter (ADC) circuit 26. The output from the ADC circuit 26 is transmitted to the digital processing microcontroller circuit 27. The output from the microcontroller 27 then provides appropriate signals to either directly drive the digital display 29, or to a display driver 35 that then provides appropriate signal levels to the digital display 29. Since actual temperature as determined by IR emissions is a function of the structure's emissivity, the instrument may have a fixed emissivity constant (typically about 0.95), or may allow the user to input an emissivity for use by the microcontroller in calculating the temperature. A hold circuit 28 is usually used to hold the measured reading on the display for a period of time after the temperature has been taken; this is a safety feature that allows the operator to look at the display when he is farther away from hazardous machinery being measured.

In the case where the IR measuring function is combined with a non-contact photo tachometer, and a reading is desired, the function switches 25 turn on a light source 21 which may be a laser diode or a focused light source. This light is reflected from the rotating or moving part on a machine. The reflecting pulses of light impinge on a photo detector pickup 20 and are shaped, if required, by pulse shaping circuit 22. The signal is then switched through the function switches 25 to the digital processing microcontroller circuit 27. The output from the microcontroller 27 then provides appropriate signals to either directly drive the digital display 29, or to a display driver 35 that then provides appropriate signal levels to the digital display 29.

A contact tachometer may be provided in addition to, or instead of, the non-contact tachometer. The contact tachometer makes physical contact with the rotating or moving part on the machine through a contact wheel or shaft 30, from which a pulse is generated, usually by either electromagnetic or photoelectric means. This pulse may then be shaped by pulse shaping circuit 32, and switched through the function switches 25 to the digital processing microcontroller circuit 27. As described above, the output from the microcontroller 27 then provides appropriate signals to either directly drive the digital display 29, or to a display driver 35 that then provides appropriate signal levels to the digital display 29.

Another embodiment may not use a microcontroller. In this case, signals from the tachometer or tachometer functions and from the IR measuring function, via the ADC circuit, may be connected directly to display driver circuit 35, which would provide the appropriate signal levels to the digital display. In this case, hold circuit 28 usually provides a signal to the display driver that latches the internal registers.

The pulse shaping circuits may also be combined and placed after the function switches, or divided on both sides of the function switches. An alternative embodiment may use a simple analog representation of the measured parameters, in which the outputs from the function switches may connect directly to an analog display 36 that includes the appropriate signal conditioning circuits.

A preferred embodiment may include a device to assist in aiming the IR temperature-measuring detector at the surface being measured. If the photo tachometer has a light source 21 that is sufficiently focused and is mounted in close proximity with an axis parallel to the axis of IR detector 24, it can be used as the aiming device. Alternatively, if only a contact tachometer is included, or the photo tachometer light source is not adequate, then a separate laser aiming device 34 and its control circuit 33 may be used.

In the preferred embodiment, a common power supply 23, which may consist of one or multiple batteries and regulating devices, provides power and reference signals to all of the functions described above.

Other embodiments will occur to those skilled in the art and are within the following claims.

What is claimed is:

1. A handheld instrument that accomplishes non-contact infrared (IR) temperature measurement and the measurement of movement of an object, comprising:
    a case;
    a light source carried by the case and adapted to shine light along a light axis from the case onto the object being measured;
    a photo detector carried by the case and adapted to capture light shone on and reflected from the object being measured and generating an output signal in response;
    a direct movement-sensing device coupled to the case and operable to be placed against an object being measured, the direct movement sensing device comprising a shaft having a distal end, the shaft adapted to be rotated by the object being measured, and further comprising a friction structure coupled to the distal end of the shaft, for placement on the object being measured, the direct movement sensing device generating an output signal based on the sensed movement;
    an IR detector carried by the case, for sensing IR energy emitted from a surface being measured along an IR-sensing axis that extends from the case, and generating an output signal;
    pulse shaping circuitry for shaping the output of the photo detector and the output of the direct movement sensing device;
    means for converting sensed IR energy to a temperature value, and for converting the output signal from the movement-sensing device and the output signal from the photo detector to at least a measured movement value; and
    a display device in the case, for displaying instrument measurements to the user.

2. The handheld instrument of claim 1, further comprising an aiming device carried by the case for emitting visible light along an aiming axis, to assist the operator in aiming the IR detector.

3. The handheld instrument of claim 2, wherein the aiming device comprises a laser diode.

4. The handheld instrument of claim 2, wherein the aiming axis is close to the IR-sensing axis.

5. The handheld instrument of claim 4, wherein the aiming axis and the IR-sensing axis are essentially parallel to one another.

6. The handheld instrument of claim 4, wherein the aiming axis and IR-sensing axis are fixed at a slight angle to one another.

7. The handheld instrument of claim 1, wherein the means for converting sensed IR energy to a temperature uses a fixed emissivity value.

8. The handheld instrument of claim 1, wherein the means for converting comprises an analog to digital converter for digitizing the movement-sensing device output signal and the IR output signal.

9. The handheld instrument of claim 1, further comprising means for maintaining a sensed temperature on the display device after the IR detector is no longer aimed at the surface being measured.

10. The handhold instrument of claim 1, further comprising a power source carried within the case, for supplying power to at least the IR detector, the means for converting, and the display device.

11. The handheld instrument of claim 10, wherein the power source comprises a DC power source.

12. The handheld instrument of claim 11, wherein the DC power source comprises a battery.

13. The handheld instrument of claim 1, further comprising switch means to control which signal is displayed.

14. The handheld instrument of claim 1, wherein the display device is a digital display device.

15. The handhold instrument of claim 1, wherein the display device is an analog display device.

16. The handheld instrument of claim 4, wherein the ease has an end, and the aiming axis and the IR-sensing axis both intersect the end of the case.

17. The handhold instrument of claim 1, wherein the photo detector has a sensing axis that is essentially parallel to the light axis.

* * * * *